United States Patent
Sood et al.

(10) Patent No.: US 11,632,662 B1
(45) Date of Patent: Apr. 18, 2023

(54) SYSTEM AND METHOD FOR DEVICE MANAGEMENT TO RESTRICT HANDOVER AND ATTACH

(71) Applicant: T-Mobile Innovations LLC, Overland Park, KS (US)

(72) Inventors: Romil Sood, Bothell, WA (US); Kunal Barawkar, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/501,262

(22) Filed: Oct. 14, 2021

(51) Int. Cl.
  *H04W 4/90* (2018.01)
  *H04W 76/50* (2018.01)
  *H04W 48/02* (2009.01)
  *H04W 84/04* (2009.01)

(52) U.S. Cl.
  CPC ............ *H04W 4/90* (2018.02); *H04W 48/02* (2013.01); *H04W 76/50* (2018.02); *H04W 84/042* (2013.01)

(58) Field of Classification Search
  CPC ....... H04W 4/90; H04W 48/02; H04W 76/50; H04W 84/042
  See application file for complete search history.

(56) References Cited

U.S. PATENT DOCUMENTS

| | | | |
|---|---|---|---|
| 10,880,792 B2* | 12/2020 | Olsson | H04W 76/30 |
| 2014/0274059 A1 | 9/2014 | Ramle et al. | |
| 2015/0281991 A1* | 10/2015 | Jung | H04W 76/18 370/329 |
| 2016/0119858 A1* | 4/2016 | Liu | H04W 76/50 455/434 |
| 2019/0363843 A1* | 11/2019 | Gordaychik | H04W 52/58 |
| 2020/0274656 A1* | 8/2020 | Gordaychik | H04L 5/0058 |
| 2021/0329536 A1* | 10/2021 | Lotfallah | H04W 48/16 |
| 2021/0377843 A1* | 12/2021 | Nayak | H04W 8/24 |
| 2022/0007182 A1* | 1/2022 | Stojanovski | H04W 12/041 |
| 2022/0014985 A1* | 1/2022 | Da Silva | H04W 76/27 |
| 2022/0104181 A1* | 3/2022 | Velev | H04W 72/04 |
| 2022/0256440 A1* | 8/2022 | Ronneke | H04W 8/20 |

* cited by examiner

*Primary Examiner* — Minjung Kim
(74) *Attorney, Agent, or Firm* — Jones Robb, PLLC

(57) ABSTRACT

Systems, methods, and process nodes for managing device connections in a telecommunications network perform and/or comprise: receiving a connection request from a wireless device at a first Public Land Mobile Network (PLMN) of the telecommunications network; comparing a capability report of the wireless device to a predetermined criteria, wherein the predetermined criteria corresponds to whether the wireless device is compatible with the first PLMN; and in response to a determination that the capability report meets the predetermined criteria, denying the connection request.

16 Claims, 5 Drawing Sheets

SYSTEM AND METHOD FOR DEVICE MANAGEMENT TO RESTRICT HANDOVER AND ATTACH

TECHNICAL BACKGROUND

Wireless telecommunications are generally provided via a plurality of geographically overlapping networks. From an infrastructure standpoint, a wireless device ("user equipment") may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR). The network, including services provided over any number of RATs, may be referred to as a Public Land Mobile Network (PLMN).

A PLMN is identified by a unique code of five or six digits, formed of a three-digit Mobile Country Code (MCC) followed by a two- or three-digit Mobile Network Code (MNC). The MCC is specific to a particular country; for example, the United States of America utilizes MCCs 310 to 316. Each PLMN may provide services using several different RATs and/or frequency bands, and a network operator may utilize several PLMNs in one country. For example, in the United States, T-Mobile operates (among others) PLMN 310-260 to provide GSM connectivity, UMTS connectivity, LTE connectivity, and NR connectivity; and PLMN 312-250 to provide LTE connectivity. Different PLMNs may provide different services to connected devices. For example, PLMN 310-260 is configured for both Evolved Packet System (EPS) services and non-EPS services, whereas PLMN 312-250 is an EPS-only network. These PLMNs thus provide different services and/or provide similar services in a different manner.

One example of a wireless service provided by a PLMN in the United States is Enhanced 911 (E911). "911" is the universal telephone number for emergency services in the United States; thus, any user of a wired or wireless telephone may simply dial 9-1-1 to be connected to an emergency services operator at a Public Safety Answering Point (PSAP). For wired telephones, E911 extends base 911 capabilities by automatically reporting the telephone number and fixed location for the caller. Wireless telephones, however, do not have a fixed location. The Federal Communications Commission (FCC) has mandated that wireless network operators implement E911 on their networks, thereby to provide an accurate location for 911 calls from wireless devices. Under Phase II of the FCC's E911 implementation current and future rules, this location must be accurate within fifty to 300 meters in the latitude and longitude directions and, in some regions, within three meters in the vertical direction. Different PLMNs implement or plan to implement location acquisition and reporting using different methods or combinations of methods, including access point triangulation using round-trip time, angle of signal arrival or departure, and/or time differential of signal arrival; geopositioning using sensors such as Global Positioning System (GPS) sensors; environmental characteristics such as barometric pressure; and so on. However, some wireless devices (e.g., those by a particular manufacturer and/or of a particular model) may not be compatible with the E911 implementation of a given PLMN.

OVERVIEW

Various aspects of the present disclosure relate to systems and methods of managing device connections in a network, such as device attach and device handover requests in a telecommunications network.

In one exemplary aspect of the present disclosure, a method of managing device connections in a telecommunications network comprises: receiving a connection request from a wireless device at a first Public Land Mobile Network (PLMN) of the telecommunications network; comparing a capability report of the wireless device to a predetermined criteria, wherein the predetermined criteria corresponds to whether the wireless device is compatible with the first PLMN; and in response to a determination that the capability report meets the predetermined criteria, denying the connection request.

In another exemplary aspect of the present disclosure, a system for managing device connections in a telecommunications network comprises: a first access node configured to provide a first Public Land Mobile Network (PLMN) of the telecommunications network; and at least one electronic processor configured to perform operations including: receiving a connection request from a wireless device; comparing a capability report of the wireless device to a predetermined criteria, wherein the predetermined criteria corresponds to whether the wireless device is compatible with the first PLMN; and in response to a determination that the capability report meets the predetermined criteria, denying the connection request.

In another exemplary aspect of the present disclosure, a processing node in a telecommunications network is configured to perform operations comprising: receiving a connection request a wireless device at a first Public Land Mobile Network (PLMN) of the telecommunications network; comparing a capability report of the wireless device to a predetermined criteria, wherein the predetermined criteria corresponds to whether the wireless device is compatible with the first PLMN; and in response to a determination that the capability report meets the predetermined criteria, denying the connection request.

In this manner, these and other aspects of the present disclosure provide for improvements in at least the technical field of telecommunications, as well as the related technical fields of network connection management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
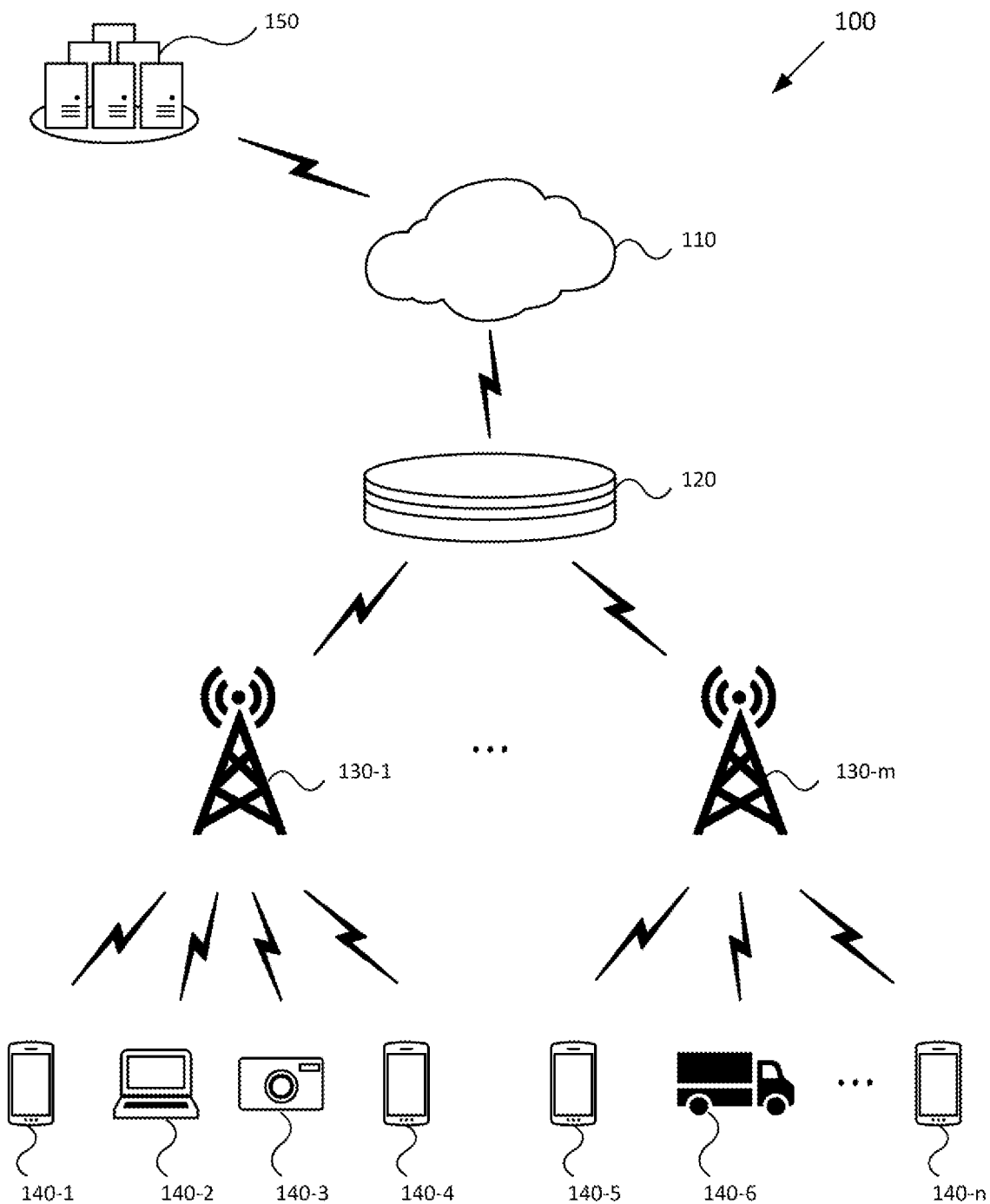
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

In accordance with various aspects of the present disclosure, multiple different PLMNs may be provided by a single network operator. Some of the PLMNs may be EPS and non-EPS networks, whereas other PLMNs may be EPS-only networks. Each PLMN may implement E911 services in a different manner (e.g., Voice over LTE (VoLTE) 911 or other methods), or some PLMNs may not implement E911 services at all. The network operator may also permit a large number of different types of wireless devices (e.g., different device manufacturers and/or models) to be associated with one or more of the PLMNs. Some devices may be non-compliant to the E911 service or otherwise incompatible with an EPS-only network. Therefore, it may be necessary or desirable to restrict these devices on one or more of the PLMNs, either for regulatory, technological, or other reasons. Device restriction may be implemented by restricting handover of such devices to a particular PLMN, preventing initial attach procedures by such devices on the particular PLMN, or both.

Thus, various aspects of the present disclosure may operate in a wireless network utilizing multiple PLMNs. By providing a system and method to dynamically restrict and/or permit connection requests based on attributes of a PLMN and/or capabilities of a wireless device the present disclosure may provide a standard solution to prevent non-compliant device types from connecting to certain PLMNs, thereby facilitating regulatory compliance, ensuring device-network compatibility, providing increased service flexibility, and the like. Moreover, systems and methods in accordance with the present disclosure may be implemented to provide extended coverage to certain network customers using additional PLMNs (e.g., PLMNs other than the devices home PLMN) while restricting those devices which are non-compliant with the additional PLMNs.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on. A "restricted wireless device" or "restricted device" is a device that is non-compliant with the E911 service provided by a PLMN, or otherwise incompatible with an EPS-only network.

A wireless device may be identified by a unique code assigned by the network operator or assigned by the device manufacturer. One example is an operator-assigned fifteen-digit identifier referred to as an International Mobile Subscriber Identity (IMSI). The IMSI is formed of the MCC/MNC of the home PLMN of a Subscriber Identity Module (SIM) associated with a wireless device, appended by a nine-digit Mobile Subscription Identification Number (MSIN) to uniquely identify the wireless device. Thus, the IMSI uniquely identifies both the wireless device and its home network. If the MCC/MNC indicated in the IMSI does not match that of a particular PLMN, that PLMN may be considered a roaming network for the device. Another example is a manufacturer-assigned fifteen-digit identifier referred to as an International Mobile Equipment Identity (IMEI). The IMEI is formed of an eight-digit Type Allocation Code (TAC), followed by an eight-digit manufacturer-defined serial number corresponding to the particular wireless device, and finally followed by a check digit. The TAC identifies the manufacturer and model of a wireless device. As such, the TAC may in some cases be used as a proxy for or indicator of the wireless device capabilities. The IMSI and/or IMEI may be stored in the wireless device or an associated storage medium (e.g., a SIM card).

A wireless device may also be identified by a non-unique code. An example of such a code is a Regional Zone Code Identity (RSZI), which is composed of a Country Code (CC) that describes the country where the PLMN is located, a National Destination Code (NDC) that identifies the PLMN itself, and a fixed-length (e.g., two octets) Zone Code (ZC) that identifies services, permissions, subscriptions, etc. of the wireless device. The RSZI may be assigned by the network operator and stored in various network entities, such as a Mobile Management Entity (MME) or a Home Subscriber Server (HSS)/Home Location Register (HLR), each of which are described in more detail below. In some implementations, the ZC may be set or changed by the network.

For purposes of illustration and explanation, various portions of this detailed description refer to a system in which the RAT is LTE; however, the present disclosure is not so limited. The systems and methods described herein may be implemented in any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an LTE cloud platform, may perform processing and forward results to the computing systems and devices 150 and/or the wireless devices 140. The core network 120, which may be an LTE core network, connects with the cloud platform 110 and the access nodes 130. For LTE communication, the core network 120 may be implemented on a fixed-function, hardwired architecture. Examples of the core network and/or the access nodes 130 will be described in more detail below with respect to FIGS. 2 and 3. Subsets of the access nodes 130 may be respectively configured to provide service in different PLMNs. For example, a first subset of the access nodes 130 may be configured to provide service for a first PLMN, a second subset of the access nodes 130 may be configured to provide service for a second PLMN, and so on. In some implementations, some or all of the access nodes 130 may be configured to provide service via multiple PLMNs. For example, a particular access node 130 may dedicate some antennas or other communication resources to providing service in a first PLMN, other antennas or other communication resources to providing service in a second PLMN, and so on.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
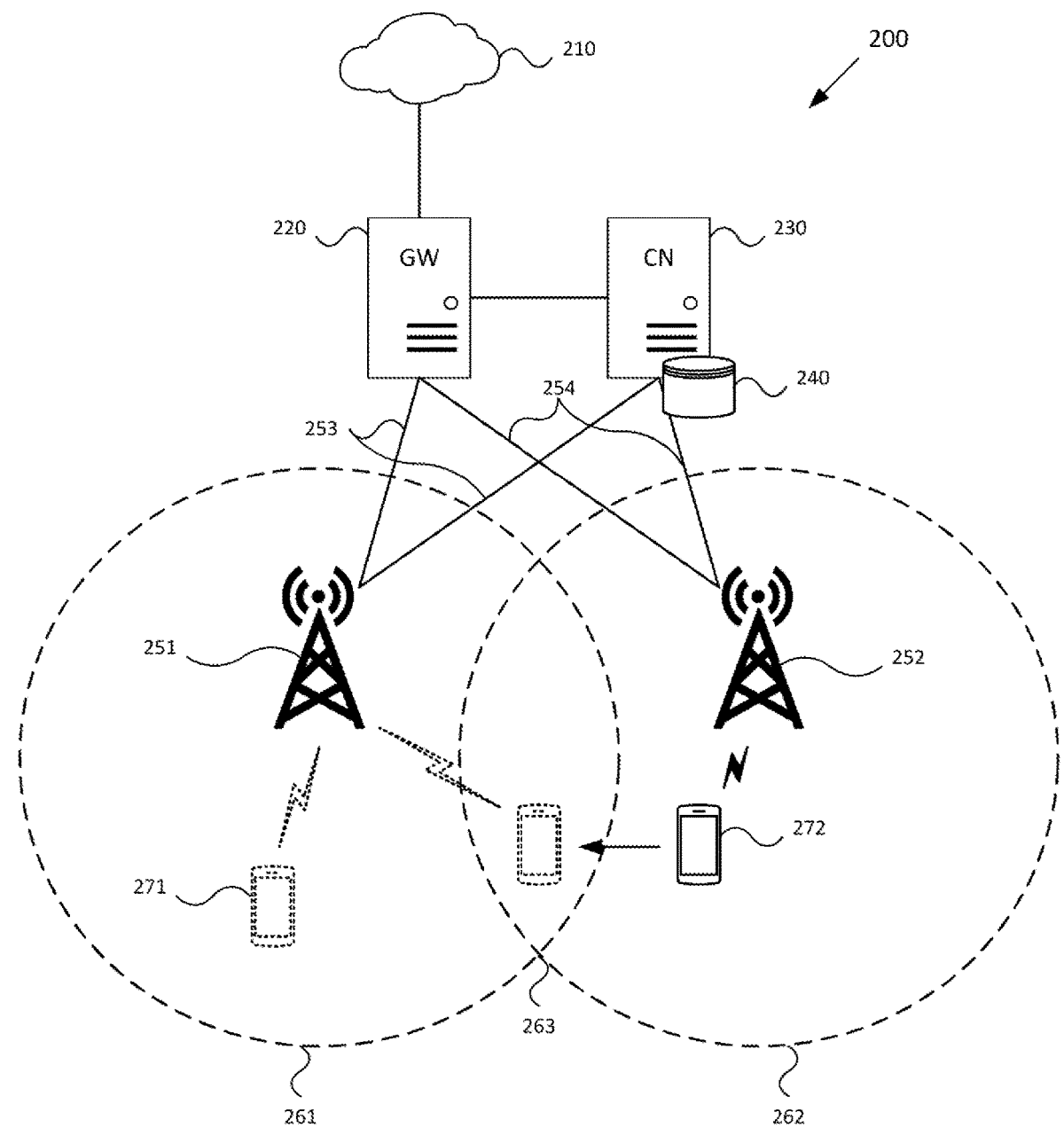
FIG. 2 illustrates an exemplary configuration of a system for wireless communication in accordance with various aspects of the present disclosure

FIG. 2 illustrates a configuration for an exemplary system 200 in accordance with various aspects of the present disclosure. As illustrated, the system 200 comprises a communication network 210, a gateway node 220, a controller node 230 which includes a database 240, a first access node 251, a second access node 252, a first wireless devices 271, and a second wireless device 272. For purposes of illustration and ease of explanation, only two access nodes and two wireless devices are shown; however, as noted above with regard to FIG. 1, additional access nodes and/or additional or fewer wireless devices may be present in the system 200. In the illustration of FIG. 2, the first access node 251 and the second access node 252 each communicate with the gateway node 220 and the controller node 230 via communication links 253 and 254, respectively. Thus, FIG. 2 illustrates an example in which the first access node 251 and the second access node 252 utilize the same network infrastructure. However, in other examples, the first access node 251 and the second access node 252 may communicate with separate gateway nodes and/or controller nodes, and therefore utilize separate network infrastructure. The first access node 251 and the second access node 252 may further be configured to communicate with one another and/or with other access nodes using a direct link (e.g., an X2 link or the like).

The first access node 251 is configured to provide service via a first PLMN, which is illustrated as having a first coverage area 261. The second access node 252 is configured to provide service via a second PLMN, which is illustrated as having a second coverage area 262. In some implementations, the first PLMN is an Equivalent PLMN (EPLMN) of the second PLMN; in other words, in such implementations the first PLMN may be treated as identical to the second PLMN for purposes of service provisioning (e.g., roaming). While the first coverage area 261 and the second coverage area 262 are illustrated as being substantially similar in size for purposes of illustration and explanation, in some implementations the first coverage area 261 and the second coverage area 262 may be differently sized or shaped. Moreover, while the first coverage area 261 and the second coverage area 262 are illustrated as having separate coverage areas and a common coverage area 263, in some implementations one of the first coverage area 261 and the second coverage area 262 may be subsumed within the other or the first coverage area 261 and the second coverage area 262 may be congruent. The first access node 251 and/or the second access node 252 may provide additional coverage areas corresponding to different RATs (such as 4G and/or 5G RATs), different PLMNs, different frequency bands, and so on.

A scheduling entity may be located within the first access node 251, the second access node 252, and/or the controller node 230, and may be configured to accept and deny connection requests, as will be described in more detail below. The first access node 251 and/or the second access node 252 may be any network node configured to provide communications between the wireless devices and the communication network 210, including standard access nodes and/or short range, lower power, small access nodes. As examples of a standard access node, the first access node 251 and/or the second access node 252 may be a macrocell access node, a base transceiver station, a radio base station, a gNodeB in 5G networks, an eNodeB in 4G/LTE networks, or the like, including combinations thereof. In one particular example, the first access node 251 and/or the second access node 252 may be a macrocell access node in which a respective range of the first coverage area 261 and/or the second coverage area 262 is from approximately five to thirty-five kilometers (km) and in which the output power is in the tens of watts (W). As examples of a small access node, the first access node 251 and/or the second access node 252 may be a microcell access node, a picocell access node, a femtocell access node, or the like, including a home gNodeB or a home eNodeB.

The first access node 251 and/or the second access node 252 can comprise one or more processors and associated circuitry to execute or direct the execution of computer-readable instructions such as those described herein. In so doing, the first access node 251 and/or the second access node 252 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the first access node 251 and/or the second access node 252 can receive instructions and other input at a user interface.

Figure 3:
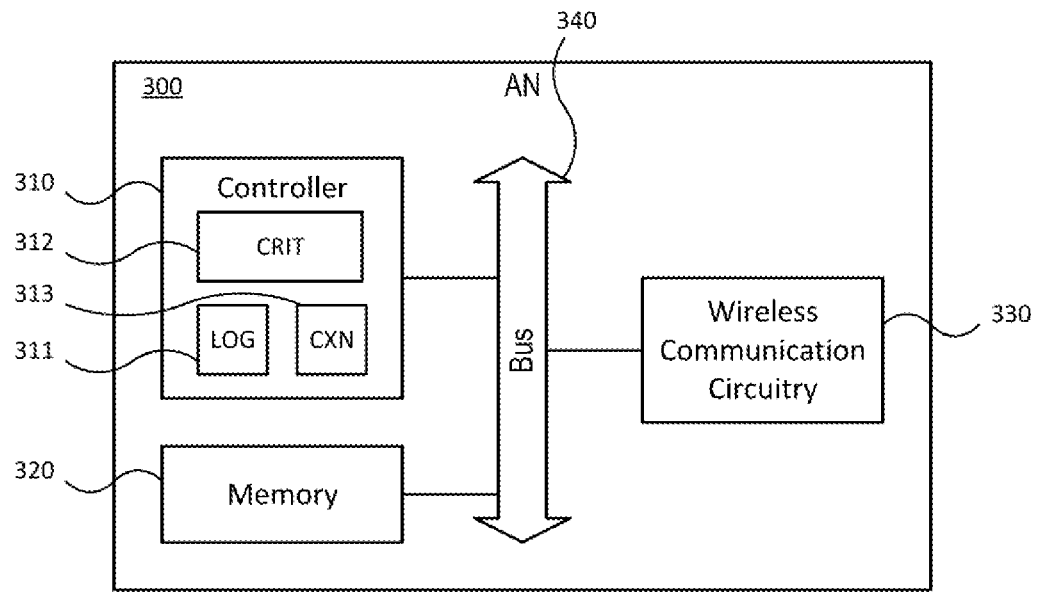
FIG. 3 illustrates an exemplary access node in accordance with various aspects of the present disclosure.

FIG. 3 illustrates one example of an access node 300, which may correspond to one or more of the access nodes 130 shown in FIG. 1 and/or the first and/or second access node 251/252 shown in FIG. 2. As illustrated the access node 300 includes a controller 310, a memory 320, wireless communication circuitry 330, and a bus 340 through which the various elements of the access node 300 communicate with one another. As illustrated, the controller 310 includes sub-modules or units, each of which may be implemented via dedicated hardware (e.g., circuitry), software modules which are loaded from the memory 320 and processed by the controller 310, firmware, and the like, or combinations thereof.

Thus, the access node 300 may implement a system and/or method to manage device connections in a telecommunications network associated with the access node 300. In one example as illustrated in FIG. 3, the access node 300 provides a first PLMN of the telecommunications network. The wireless communication circuitry 330 may be configured to receive a connection request from a wireless device seeking to join the first PLMN. The connection request may further include a capability report of the wireless device or be followed by the capability report. The capability report may be or include identifying information of the wireless device which the access node 300 may use for the determination. This identifying information includes, but is not limited to, an IMSI, an MCC and/or MNC of a home PLMN of a SIM associated with the wireless device, a MSIN, an IMEI, a TAC, an RSZI, a ZC, or combinations thereof. The controller 310 includes a logic unit 311, which may be configured to compare the capability report to a predetermined criteria that is loaded to (e.g., from the memory 320) or stored in a criteria unit 312. The predetermined criteria may itself indicate, or may contain information usable to determine, whether the wireless device is incompatible with the first PLMN or with a service provided by the first PLMN (e.g., E911 service implementation). The controller 310 further includes a connection determination unit 313 which may accept or deny the connection request based on an output of the logic unit 311. For example, in response to a determination that the capability report meets the predetermined criteria (and is thus incompatible), the connection determination unit 313 may deny the connection request.

The logic unit 311, the criteria unit 312, and the connection determination unit 313 are illustrated as residing within the controller 310 for ease of explanation; however, one or more of the units may instead reside within the memory 320 and/or may be provided as separate units within the access node 300. Moreover, while the logic unit 311, the criteria unit 312, and the connection determination unit 313 are illustrated as separate units, in practical implementations some or all of the units may be combined and/or share components.

The wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive connection requests via the wireless communication circuitry 330 and output connection determinations via the wireless communication circuitry 330, thereby allowing or denying the connection requests. The access node 300 may include additional wireless communication circuitry elements, for example to communicate using PLMNs other than the first PLMN and/or to provide connectivity for different RATs. The access node 300 may further include additional wired communication circuitry elements.

Returning to FIG. 2, various wireless devices may be present in one or both of the first coverage area 261 and the second coverage area 262, may become present in one or both of the first coverage area 261 and the second coverage area 262, may move from one coverage area to another, and/or may move from one coverage area to a common coverage area 263 of the first coverage area 261 and the second coverage area 262. Two cases in particular are illustrated in FIG. 2. The first wireless device 271 is illustrated with a dotted line to show that it may become introduced into the system 200 (e.g., by powering on or waking from a sleep mode). Upon introduction into the system 200, the first wireless device 271 may submit a connection request to the first access node 251 (referred to as a "initial attach request"). The second wireless device 272 is illustrated with a solid line to show that it is currently present in system 200 and located in the second coverage area 262, and also with a dotted line to show that it may be mobile and move into the common coverage area 263. Upon entering the common coverage area 263, the second wireless device 272 may submit a connection request to the first access node 251 via the second access node 252 (referred to as a "handover request").

Figure 4:
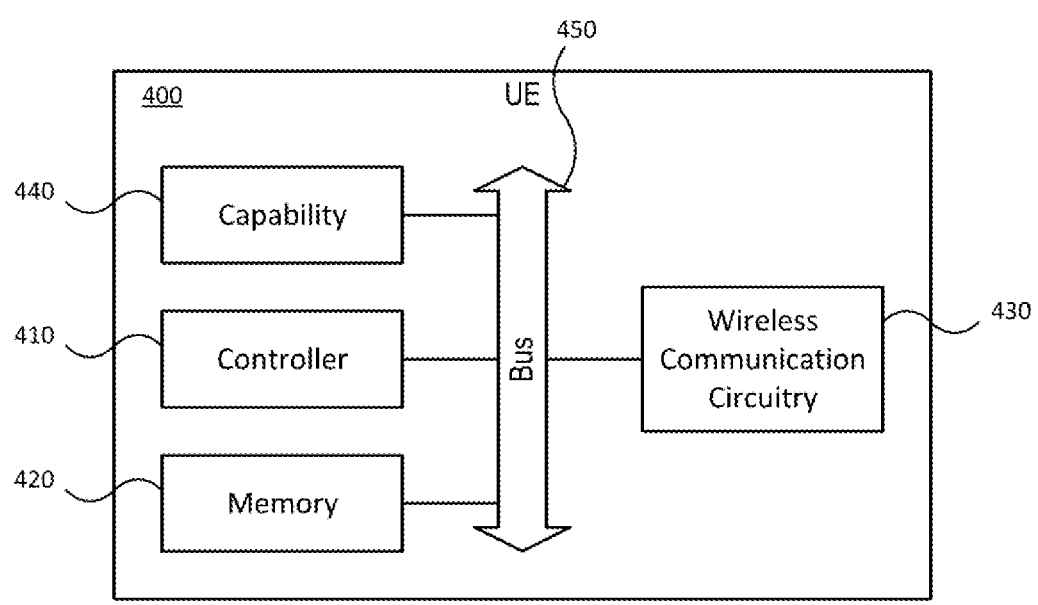
FIG. 4 illustrates an exemplary set of resources in accordance with various aspects of the present disclosure.

FIG. 4 illustrates one example of a wireless device 400 (i.e., a UE), which may correspond to one or more of the wireless devices 140 shown in FIG. 1 and/or the first wireless device 271 and/or the second wireless device 272 shown in FIG. 2. As illustrated the wireless device 400 includes a controller 410, a memory 420, a wireless communication circuitry 430, a capability component 440, and a bus 450 through which the various elements of the wireless device 400 communicate with one another. The capability component 440 may include storage media to store information related to the capability of the wireless device 400; for example, a capability report. The capability component 440 may be a separate storage area from the memory 420, such as a SIM card separate from a main memory of the wireless device 400.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit connection requests via the wireless communication circuitry 430 and receive responses via the wireless communication circuitry 430, the responses indicating whether the connection requests have been accepted or denied. The wireless device 400 may include additional wireless communication circuitry elements, for example to communicate using different RATs.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless devices 260. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links 253 and 254 may respectively use various communication media, such as air, space, metal, optical fiber, other signal propagation paths, and combinations thereof. The communication links 253 and 254 may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links 253 and 254 may respectively be a direct link or might include various equipment, intermediate components, systems, and networks. The communication links 253 and 254 may comprise many different signals sharing the same link.

The gateway node 220 may be any network node configured to interface with other network nodes using various protocols. The gateway node 220 can communicate user data over the system 200. The gateway node 220 may be a standalone computing device, computing system, or network component, and can be accessible by, for example, a wired or wireless connection, or through an indirect connection such as via a computer network or communication network. The gateway node 220 may include but is not limited to a serving gateway (SGW) and/or a public data network gateway (PGW). Additionally or alternatively, the gateway node 220 may include user plane network functions (NFs), such as a User Plane Function (UPF). The gateway node 220 is not limited to any specific technology architecture, such as LTE or 5G NR, but may be used with any network architecture and/or protocol.

The gateway node 220 can comprise a processor and associated circuitry to execute or direct the execution of computer-readable instructions to obtain information. In so doing, the gateway node 220 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node 220 can receive instructions and other input at a user interface.

The controller node 230 may be any network node configured to communicate and/or control information over the system 200. The controller node 230 may be configured to transmit control information associated with resource usage thresholds and/or usage parameters. The controller node 230 may be a standalone computing device, computing system, or network component, and can be accessible by, for example, a wired or wireless connection, or through an indirect connection such as via a computer network or communication network. The controller node 230 may include but is not limited to an MME, a HSS, a Policy Control and Charging Rules Function (PCRF), an authentication, authorization, and accounting (AAA) node, a rights management server (RMS), a subscriber provisioning server (SPS), a policy server, and the like. Additionally or alternatively, the controller node 230 may comprise user plane NFs and/or control plane NFs, including but not limited to a Core Access and Mobility management Function (AMF), an Authentication Server Function (AUSF), a Unified Data Management (UDM), a Session Management Function (SMF), a Policy Control Function (PCF), an Application Function (AF), a Network Exposure Function (NEF), a NF Repository Function (NRF), a Network Slice Selection Function (NSSF), a Short Message Service Function (SMSF), and the like. The controller node 230 is not limited to any specific technology architecture, such as LTE or 5G NR, but may be used with any network architecture and/or protocol.

The controller node 230 can comprise a processor and associated circuitry to execute or direct the execution of computer-readable instructions to obtain information. In so doing, the controller node 230 can retrieve and execute software from storage, which can include a disk drive, a flash drive, memory circuitry, or some other memory device, and which may be local or remotely accessible. As illustrated in FIG. 2, the controller node 230 includes the database 240 for storing information, such as predetermined resource usage thresholds utilized for dynamically managing RATs of the first and second wireless devices 271/272, as well as positions and/or characteristics of the wireless devices 260. The database 240 may further store handover thresholds, scheduling schemes, and resource allocations for the first and/or second access nodes 251/252, the first and/or second wireless devices 271/272, and so on. This information may be requested or shared with the first and/or second access nodes 251/252 via the communication link 254, X2 connections, and the like. The software may comprise computer programs, firmware, or some other form of machine-readable instructions, and may include an operating system, utilities, drivers, network interfaces, applications, or some other type of software, including combinations thereof. Moreover, the controller node 230 can receive instructions and other input at a user interface.

Other network elements may be present in system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access nodes 250 and communication network 210.

Figure 5:
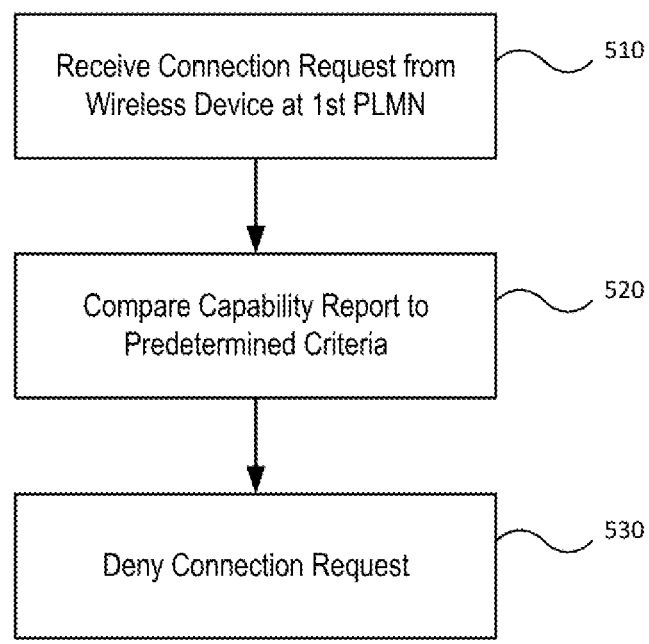
FIG. 5 illustrates an exemplary process flow for managing device connections in accordance with various aspects of the present disclosure.
Figure 6A:
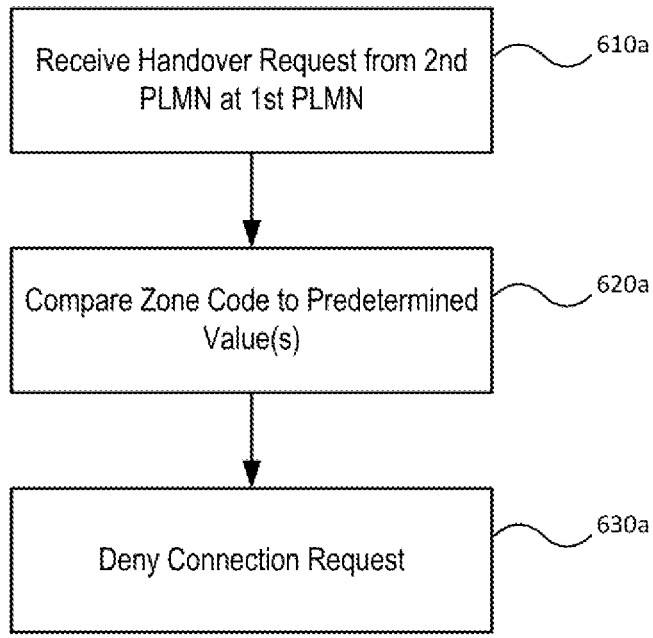
FIGS. 6A and 6B respectively illustrate other exemplary process flows for managing device connections in accordance with various aspects of the present disclosure.
Figure 6B:
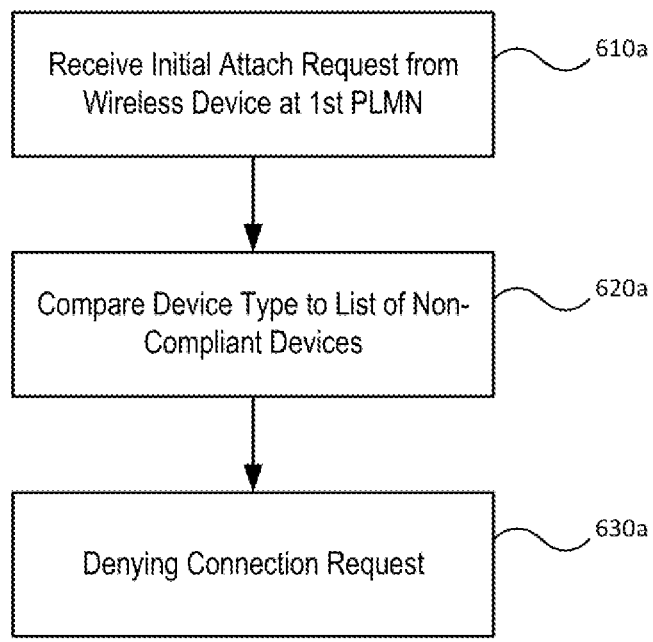

Devices or systems in accordance with various aspects of the present disclosure may perform various operations to dynamically determine access to or allocation of common resource blocks. Exemplary methods including these operations are illustrated in FIGS. 5-6B. The methods of FIGS. 5-6B may be triggered by various events, such as a ping received from a wireless device, or may be triggered upon receipt of a communication request as will be described in more detail below. For purposes of explanation, the methods of FIGS. 5-6B will be described as being performed in the access node 300 (which provides a first PLMN) and as corresponding to the wireless device 400; however, this is merely exemplary and not limiting.

FIG. 5 illustrates an exemplary method in the general case of a wireless device requesting to join a network. At operation 510, the access node 300 receives a connection request from the wireless device 400. The connection request may include a capability report of the wireless device 400 or may be followed by the capability report. At operation 520, the access node 300 compares a capability report of the wireless device to a predetermined criteria, wherein the predetermined criteria corresponds to whether the wireless device 400 is compatible with the first PLMN. In response to a determination at operation 520 that the capability report meets the predetermined criteria, at operation 530 the access node 300 then denies the connection request. If instead operation 520 determines that the capability report does not meet the predetermined criteria, the access node 300 may accept the connection request.

The general case of FIG. 5 may be implemented differently depending on whether the connection request is an initial attach request (e.g., as in the first wireless device 271 shown in FIG. 2) or a handover request (e.g., as in the second wireless device 272). FIG. 6A illustrates an exemplary method for the specific case of a handover request, whereas FIG. 6B illustrates an exemplary method for the specific case of an initial attach request.

In FIG. 6A, the connection request is a handover request received via a second PLMN of the network, the second PLMN being a home network of the wireless device 400. Thus, at operation 610a, the access node 300 receives a connection request from the second PLMN (e.g., from an access node implementing the second PLMN). The first PLMN may be an EPLMN of the second PLMN. In this scenario, the capability report may include a ZC that has been set to a predetermined value by the home network in response to a determination (which may be performed prior to the time of the handover operation) that the wireless device 400 does not support an E911 service. The prior determination may have been performed during an attach process between the wireless device 400 and the access node implementing the second PLMN. For example, during the previous attach process, the home network may determine that the wireless device 400 does not support the E911 service and cause the wireless device 400 to set its ZC to the predetermined value.

Thus, at operation 620a, the access node compares the ZC to the predetermined value or to a list of predetermined values. In response to a determination at operation 620a that the ZC equals the predetermined value or is among the list of predetermined values, at operation 630a the access node 300 then denies the handover request. If instead operation 620a determines that the ZC does not equal the predetermined value or is not among the list of predetermined values, the access node 300 may accept the handover request.

In FIG. 6B, the connection request is an initial attach request received directly from the wireless device 400 (e.g., not from another access node or PLMN). Thus, at operation 610a, the access node 300 receives an initial attach request from the wireless device 400. In this scenario, the capability report may include a device type of the wireless device. The device type may be, or may be included in, data indicating a manufacturer and/or a model of the wireless device 400, such as an IMEI or a TAC.

Thus, at operation 620b, the access node compares the device type to a list of non-compliant devices. For example, the access node may compare a TAC of the wireless device 400 to a list of devices that do not support an E911 service of the first PLMN. The list of devices may be set and/or maintained by a network operator. In some implementations, the list is provided in the form of a lookup table. In response to a determination at operation 620b that the device type is included in the list of non-compliant devices, at operation 630b the access node 300 then denies the attach request. If instead operation 620b determines that the device type is not included in the list of non-compliant devices, the access node 300 may accept the attach request.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing device connections in a telecommunications network, the method comprising:
   receiving a connection request from a wireless device at a first Public Land Mobile Network (PLMN) of the telecommunications network;
   comparing a capability report of the wireless device to a predetermined criteria, wherein the predetermined criteria corresponds to whether the wireless device is compatible with the first PLMN; and
   in response to a determination that the capability report meets the predetermined criteria, denying the connection request, wherein
   the connection request is a handover request received via a second PLMN of the telecommunications network, the second PLMN being a home network of the wireless device,
   the capability report includes a Zone Code, the Zone Code having been set to a predetermined value by the home network in response to a determination that the wireless device does not support an Enhanced 911 (E-911) service during an attach process between the wireless device and the home network, and
   the predetermined criteria is that the Zone Code is equal to the predetermined value.

2. The method according to claim 1, wherein the first PLMN is an Equivalent PLMN (EPLMN) of the second PLMN.

3. The method according to claim 1, further comprising:
   in response to a determination that the capability report does not meet the predetermined criteria, accepting the connection request.

4. A system for managing device connections in a telecommunications network, the system comprising:
   a first access node configured to provide a first Public Land Mobile Network (PLMN) of the telecommunications network; and
   at least one electronic processor configured to perform operations including:
      receiving a connection request from a wireless device;
      comparing a capability report of the wireless device to a predetermined criteria, wherein the predetermined criteria corresponds to whether the wireless device is compatible with the first PLMN; and
      in response to a determination that the capability report meets the predetermined criteria, denying the connection request, wherein
   the connection request is a handover request received from a second access node, the second access node being configured to provide a second PLMN of the telecommunications network, the second PLMN being a home network of the wireless device,
   the capability report includes a Zone Code, the Zone Code having been set to a predetermined value by the home network in response to a determination that the wireless device does not support an Enhanced 911 (E-911) service during an attach process between the wireless device and the home network, and
   the predetermined criteria is that the Zone Code is equal to the predetermined value.

5. The system according to claim 4, wherein the first PLMN is an Equivalent PLMN (EPLMN) of the second PLMN.

6. A processing node in a telecommunications network, the processing node being configured to perform operations comprising:
   receiving a connection request a wireless device at a first Public Land Mobile Network (PLMN) of the telecommunications network;
   comparing a capability report of the wireless device to a predetermined criteria, wherein the predetermined criteria corresponds to whether the wireless device is compatible with the first PLMN; and
   in response to a determination that the capability report meets the predetermined criteria, denying the connection request, wherein
   the connection request is a handover request received via a second PLMN of the telecommunications network, the second PLMN being a home network of the wireless device,
   the capability report includes a Zone Code, the Zone Code having been set to a predetermined value by the home network in response to a determination that the wireless device does not support an Enhanced 911 (E-911) service during an attach process between the wireless device and the home network, and
   the predetermined criteria is that the Zone Code is equal to the predetermined value.

7. The processing node according to claim 6, wherein the first PLMN is an Equivalent PLMN (EPLMN) of the second PLMN.

8. The method according to claim 1, wherein the capability report is included in the connection request.

9. The method according to claim 1, wherein the Zone Code is stored in a network entity of the first PLMN, the method further comprising:
   after receiving the connection request and before comparing the capability report to the predetermined criteria, receiving the capability report from the network entity.

10. The system according to claim 4, wherein the at least one electronic processor is further configured to, in response to a determination that the capability report does not meet the predetermined criteria, accept the connection request.

11. The system according to claim 4, wherein the capability report is included in the connection request.

12. The system according to claim 4, wherein the Zone Code is stored in a network entity of the first PLMN, and the at least one electronic processor is further configured to, after receiving the connection request and before comparing the capability report to the predetermined criteria, receive the capability report from the network entity.

13. The system according to claim 4, wherein the first access node comprises the at least one electronic processor.

14. The processing node according to claim 6, the operations further comprising: in response to a determination that the capability report does not meet the predetermined criteria, accepting the connection request.

15. The processing node according to claim 6, wherein the capability report is included in the connection request.

16. The processing node according to claim 6, wherein the Zone Code is stored in a network entity of the first PLMN, and the operations further comprise, after receiving the connection request and before comparing the capability report to the predetermined criteria, receiving the capability report from the network entity.

* * * * *